United States Patent
Sun et al.

(10) Patent No.: US 11,432,172 B2
(45) Date of Patent: Aug. 30, 2022

(54) CHANNEL ESTABLISHMENT METHOD AND BASE STATION

(71) Applicant: Huawei Technologies Co., Ltd., Shenzhen (CN)

(72) Inventors: Xiangkai Sun, Chengdu (CN); Zhilong Zhang, Shenzhen (CN); Kun Yang, Shanghai (CN); Jiansheng Tang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 188 days.

(21) Appl. No.: 16/888,175

(22) Filed: May 29, 2020

(65) Prior Publication Data

US 2020/0296607 A1 Sep. 17, 2020

Related U.S. Application Data

(63) Continuation of application No. PCT/CN2018/100806, filed on Aug. 16, 2018.

(30) Foreign Application Priority Data

Nov. 30, 2017 (CN) .......................... 201711242228.1

(51) Int. Cl.
*H04W 24/04* (2009.01)
*H04L 61/5014* (2022.01)
*H04W 92/04* (2009.01)

(52) U.S. Cl.
CPC ......... *H04W 24/04* (2013.01); *H04L 61/2015* (2013.01); *H04W 92/045* (2013.01)

(58) Field of Classification Search
CPC ... H04W 24/04; H04W 92/045; H04W 88/08; H04L 61/2015
See application file for complete search history.

(56) References Cited

U.S. PATENT DOCUMENTS

| | | | |
|---|---|---|---|
| 2004/0264439 A1* | 12/2004 | Doherty | H04L 65/1006 370/352 |
| 2009/0022058 A1* | 1/2009 | Li | H04L 41/0677 370/242 |
| 2010/0050017 A1 | 2/2010 | Almadi et al. | |

(Continued)

FOREIGN PATENT DOCUMENTS

| | | |
|---|---|---|
| CN | 103517376 A | 1/2014 |
| CN | 103547334 A | 1/2014 |

(Continued)

*Primary Examiner* — Tejis Daya
(74) *Attorney, Agent, or Firm* — Leydig, Voit & Mayer, Ltd.

(57) ABSTRACT

This application relates to the field of communications technologies, and more specifically, to a technology for establishing an operation and management channel. In a channel establishment method, a base station obtains a connection status of an operation and management channel between a base station and an operation support system OSS server. If the connection status indicates that there is a connection exception on the operation and management channel, the base station obtains a historical channel establishment parameter that is stored in the base station before a current moment and that is used by the base station to establish the operation and management channel with the OSS server.

8 Claims, 5 Drawing Sheets

(56) References Cited

U.S. PATENT DOCUMENTS

2015/0341189 A1* 11/2015 Zhang ................ H04L 61/2015
370/338
2017/0318483 A1  11/2017 Zhang

FOREIGN PATENT DOCUMENTS

| | | | |
|---|---|---|---|
| CN | 103561124 A | 2/2014 | |
| CN | 103636167 A | 3/2014 | |
| CN | 103714060 A | 4/2014 | |
| CN | 104618943 A * | 5/2015 | |
| CN | 104618943 A | 5/2015 | |
| EP | 2892274 A1 * | 7/2015 | ............ H04W 24/04 |
| EP | 3091780 A1 | 11/2016 | |
| WO | 2012079417 A1 | 6/2012 | |
| WO | WO-2012079417 A1 * | 6/2012 | ............. H04L 12/58 |
| WO | 2016187841 A1 | 12/2016 | |
| WO | 2017066954 A1 | 4/2017 | |

* cited by examiner

CHANNEL ESTABLISHMENT METHOD AND BASE STATION

CROSS-REFERENCE TO RELATED APPLICATIONS

This application is a continuation of International Application No. PCT/CN2018/100806, filed on Aug. 16, 2018, which claims priority to Chinese Patent Application No. 201711242228.1, filed on Nov. 30, 2017. The disclosures of the aforementioned applications are hereby incorporated by reference in their entireties.

TECHNICAL FIELD

This application relates to the field of communications technologies, and more specifically, to a technology for establishing an operation and management channel.

BACKGROUND

In a communications network, an operation support system (OSS) is used for remote operation and management of a base station, to perform normal operation and management, fault diagnosis, and the like on the base station. To implement remote operation and management of the base station, a communication connection channel needs to be established between the base station and an operation support system server. The communication connection channel is referred to as an operation and management channel (OMCH).

However, when a misoperation occurs or some faults occur on a base station side, the OMCH channel between the base station and the OSS server may be interrupted. For example, the base station cannot establish the OMCH channel with the OSS server due to a startup exception. For another example, a fault occurs during running of the base station, and consequently the OMCH channel between the base station and the OSS server is interrupted. Once the OMCH channel between the base station and the OSS server is interrupted, remote operation and management of the base station performed by the OSS is affected. Therefore, operation and management personnel need to go to each base station side to resolve such a problem. This consumes a lot of human resources. Therefore, how to establish or recover a connection of the OMCH channel between the base station and the OSS server when the OMCH channel between the base station and the OSS server is interrupted, to ensure stable connection of the OMCH channel between the base station and the OSS server is a technical problem that a person skilled in the art urgently needs to resolve.

SUMMARY

In view of this, embodiments of this application provide a channel establishment method and a base station, to more reliably establish an OMCH channel between a base station and an OSS server, and ensure reliable connection of the OMCH channel between the base station and the OSS server.

To achieve the foregoing objective, a first aspect of this application provides a channel establishment method. In the method, a base station obtains a connection status of an operation and management channel between the base station and an operation support system OSS server, where the operation and management channel is configured to implement a communication connection between the base station and the OSS server; and the base station may obtain a historical channel establishment parameter stored in the base station when there is a connection exception on the operation and management channel, where the historical channel establishment parameter is a channel establishment parameter used by the base station to establish the operation and management channel with the OS S server before a current moment. In this way, the connection of the operation and management channel between the base station and the OSS server may be established based on the historical channel establishment parameter, thereby reducing a case in which the operation and management channel between the base station and the OSS server cannot be established or recovered because the base station cannot obtain a channel establishment parameter required for establishing the operation and management channel. Therefore, this helps ensure reliable connection of the operation and management channel between the base station and the OSS server.

In a possible design, the base station obtains the historical channel establishment parameter stored in the base station when the obtained connection status indicates that the operation and management channel already established between the base station and the OSS server is interrupted, to reestablish the operation and management channel based on the historical channel establishment parameter.

In a possible design, when the base station detects that the operation and management channel already established between the base station and the OSS server is interrupted, the base station may further perform initialization of the base station and use a channel establishment parameter obtained in an initialization process, before obtaining the historical channel establishment parameter stored in the base station, to establish the connection of the operation and management channel between the base station and the OSS server. In addition, when the base station detects that the operation and management channel is successfully connected, the base station stores, in the base station as the historical channel establishment parameter, the channel establishment parameter obtained in the initialization process. Therefore, when the operation and management channel is subsequently interrupted, the operation and management channel between the base station and the OSS server may be reestablished based on the historical channel establishment parameter.

In a possible design, the base station may obtain the historical channel establishment parameter stored in the base station when the base station detects that the base station cannot obtain, in the initialization process, the channel establishment parameter required for establishing the operation and management channel, or the base station cannot successfully establish the operation and management channel with the OSS server based on a currently already configured channel establishment parameter, to implement connection of the operation and management channel between the base station and the OSS server based on the historical channel establishment parameter.

In a possible design, the base station may further first broadcast a dynamic host configuration protocol (DHCP) probe message before obtaining the historical channel establishment parameter stored in the base station. The base station may establish the connection of the operation and management channel between the base station and the server based on the channel establishment parameter obtained from a DHCP server when receiving the channel establishment parameter returned by the DHCP server for the DHCP probe message. The base station performs an operation of obtaining the historical channel establishment parameter stored in the base station when no response message for the DHCP probe message is received.

According to another aspect, this application further provides a base station. The base station includes a processor, a memory, and a communications interface.

The processor is configured to: obtain a connection status of an operation and management channel between a base station and an operation support system OSS server, where the operation and management channel is configured to implement a communication connection between the base station and the OSS server; and obtain a stored historical channel establishment parameter from the memory when there is a connection exception on the operation and management channel, where the historical channel establishment parameter is a channel establishment parameter used by the base station to establish the operation and management channel with the OSS server before a current moment.

The communications interface is configured to establish the connection of the operation and management channel between the base station and the OSS server based on the historical channel establishment parameter.

The memory is configured to store the historical channel establishment parameter.

In a possible design, when obtaining the stored historical channel establishment parameter from the memory when there is the connection exception on the operation and management channel, the processor is specifically configured to: obtain the historical channel establishment parameter stored in the base station when the processor detects that the operation and management channel already established between the base station and the OSS server is interrupted.

In a possible design, the processor is further configured to perform initialization of the base station before obtaining the stored historical channel establishment parameter from the memory when the processor detects that the operation and management channel already established between the base station and the OSS server is interrupted.

The communications interface is further configured to establish the connection of the operation and management channel between the base station and the OSS server by using a channel establishment parameter obtained in an initialization process.

The processor is further configured to: when the processor detects that the operation and management channel is successfully connected, store, in the memory as the historical channel establishment parameter, the channel establishment parameter obtained in the initialization process.

In a possible design, when the base station obtains the stored historical channel establishment parameter from the memory when there is the connection exception on the operation and management channel, the base station is specifically configured to: obtain the stored historical channel establishment parameter from the memory when the base station detects that the base station cannot obtain a channel establishment parameter required for establishing the operation and management channel, or that the base station cannot successfully establish the operation and management channel with the OSS server by using a currently already configured channel establishment parameter.

In a possible design, the processor is further configured to: broadcast a dynamic host configuration protocol DHCP probe message by using the communications interface before obtaining the historical channel establishment parameter stored in the base station.

The communications interface is further configured to: broadcast the dynamic host configuration protocol DHCP probe message; and establish the connection of the operation and management channel between the base station and the server based on the channel establishment parameter obtained from a DHCP server when the channel establishment parameter returned by the DHCP server for the DHCP probe message is received.

When broadcasting the dynamic host configuration protocol DHCP probe message, the processor is specifically configured to: obtain, from the memory, the historical channel establishment parameter stored in the base station when the communications interface does not receive a response message for the DHCP probe message.

The second aspect and the first aspect of the embodiments of this application are consistent in design ideas, and similar in technical means. For specific beneficial effects brought by the technical solutions, refer to the first aspect. Details are not described herein again.

DESCRIPTION OF EMBODIMENTS

A channel establishment method and a network element in the embodiments of this application are applicable to a plurality of different communications systems. For ease of understanding, an application scenario is used as an example for description.

Figure 1:
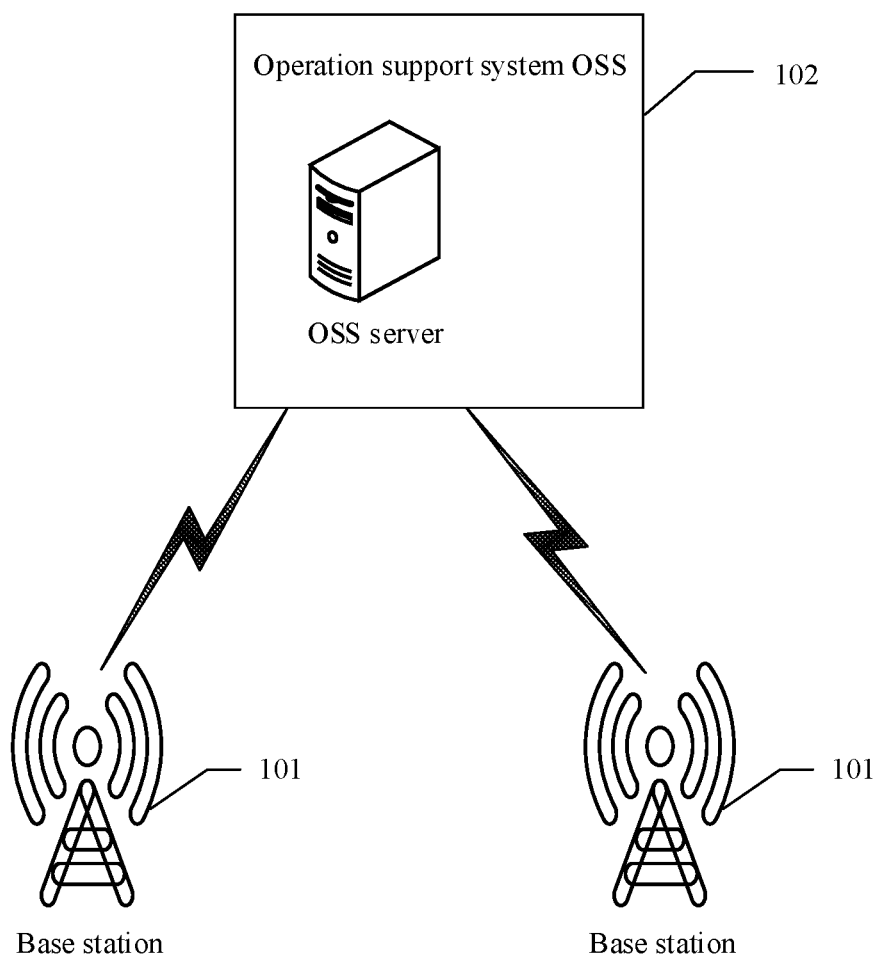
FIG. 1 is a schematic diagram of a composition structure of an application scenario to which a channel establishment method according to an embodiment of this application is applicable.

For example, FIG. 1 is a schematic diagram of a composition structure of an application scenario to which a channel establishment method according to this application is applicable.

A base station 101 and an operation support system (OSS) 102 may be included in the scenario.

It should be noted that the base station may also be considered as a base station subsystem, and the base station may be a radio base station, or may be a base station of another type. This is not limited herein. The operation support system may also be referred to as an operation management system, and may include at least one server. For example, FIG. 1 shows a case in which the operation support system includes an operation support system server (OSS server). However, a case in which the operation support system is a server cluster including a plurality of OSS servers is also applicable to this embodiment of this application.

The base station may establish an operation and management channel (OMCH) with the OSS server, and implement communication between the base station and the OSS server through the OMCH channel, so that the OSS server can perform remote operation and management of the base station.

It may be understood that before the base station establishes the OMCH channel with the OSS server, the base station needs to obtain a channel establishment parameter required for establishing the OMCH. For example, the channel establishment parameter may include an IP address of the base station, an IP address of the OSS server, or the like. Certainly, the channel establishment parameter may alternatively include a routing table, and the routing table may include an IP address of a next-hop node.

For example, referring to the following Table 1, Table 1 lists a plurality of types of parameter information included in the channel establishment parameter that is used to establish the OMCH channel.

TABLE 1

| Serial number | Description | Remarks |
|---|---|---|
| 1 | IP address of the base station | IP address of the base station in the OMCH channel |
| 2 | OSS IP Address | IP address of the OSS server in the OMCH channel |
| 3 | Next-hop IP address of a route | |
| 4 | Transmission board (logical slot and physical slot) | Physical board of a route obtained by searching for an effective route based on a local IP address and a peer IP address of the base station connected to the OMCH channel |
| 5 | Transmission port information (logical port information and physical port information) | |
| 6 | Interface DEVIP | |
| 7 | Identifier of a transmission virtual local area network of the OMCH channel | |
| 8 | IP address of a security gateway | |
| 9 | Local name of the security gateway | |
| 10 | Cabinet, subrack, and slot of a main control board | |

Certainly, Table 1 is merely an example. In actual application, the channel establishment parameter may include more or fewer parameters than those in Table 1.

For ease of understanding of the solutions in this application, several possible cases in which the OMCH between the base station and the OSS server is interrupted are first described.

In a possible case, after the base station is powered on and initialized, the base station establishes the OMCH channel with the OSS server. However, if the base station is abnormally initialized, the base station cannot obtain the channel establishment parameter required for establishing the OMCH channel, or the base station cannot successfully establish a stable OMCH channel by using configuration information in a current database. Consequently, the OMCH between the base station and the OSS server is interrupted. In this case, the base station cannot implement connection of the OMCH channel between the base station and the OSS server due to lack of the channel establishment parameter.

In another possible case, after the OMCH channel between the base station and the OSS server is connected, if an internal defect or a misoperation occurs on a base station side, the connection of the OMCH channel between the base station side and the OSS server may be interrupted. In this case, if the misoperation occurs, the OMCH channel between the base station and the OSS server can be recovered by using a rollback operation. However, a prerequisite is that the base station needs to store running data in the base station that exists before the misoperation. Otherwise, the rollback fails, resulting in relatively high complexity in recovering the OMCH. In addition, the rollback operation is applicable to only some misoperations, not all misoperations; the rollback operation is not applicable to OMCH interruption caused by an internal defect of the base station.

Certainly, there may be other reasons why the OMCH channel between the base station and the OSS server is interrupted. These reasons are not listed one by one herein.

After a plurality of cases in which the OMCH channel between the base station and the OSS server is interrupted are researched, the inventor finds that the base station cannot obtain the channel establishment parameter used to establish the OMCH channel with the OSS server after the OMCH channel between the base station and the OSS server is interrupted. Consequently, the base station cannot establish or recover the OMCH channel with the OSS server. To further resolve the problem, the inventor finds through research that if the base station stores the channel establishment parameter when the OMCH channel between the base station and the OSS server is interrupted, the base station may still establish the connection of the OMCH with the OSS server based on the channel establishment parameter.

Based on the foregoing research, in this application, when the OMCH channel between the base station and the OSS server is interrupted, a historical channel establishment parameter used by the base station to establish the OMCH channel with the OSS server before a current moment is obtained, and the communication connection is established to the OSS server based on the historical channel establishment parameter. For ease of differentiation, a channel establishment parameter used by a historical OMCH channel before a current moment is referred to as a historical channel establishment parameter.

For ease of understanding of the solutions in this application, a composition structure of the base station is first described.

Figure 2:
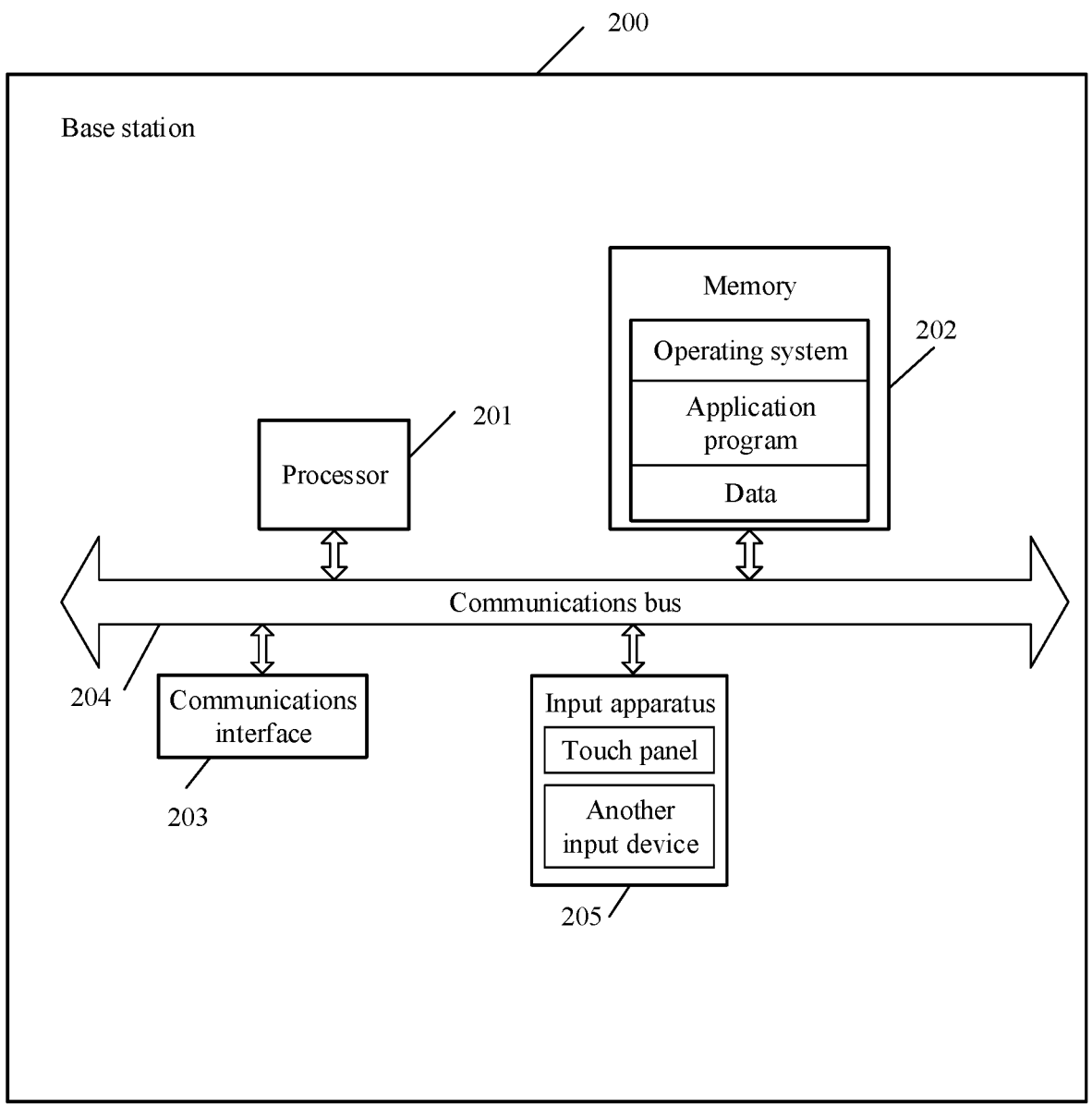
FIG. 2 is a schematic diagram of a composition structure of a base station according to an embodiment of this application.

For example, FIG. 2 is a schematic diagram of a composition structure of a base station according to this application. As shown in FIG. 2, the base station 200 includes a processor 201, a memory 202, and a communications interface 203.

The processor 201 is configured to: obtain a connection status of an operation and management channel between a base station and an operation support system OSS server, where the operation and management channel is configured to implement a communication connection between the base station and the OSS server; and obtain a stored historical channel establishment parameter from the base station when there is a connection exception on the operation and management channel, where the historical channel establishment parameter is a channel establishment parameter used by the base station to establish the operation and management channel with the OSS server before a current moment.

Figure 4:
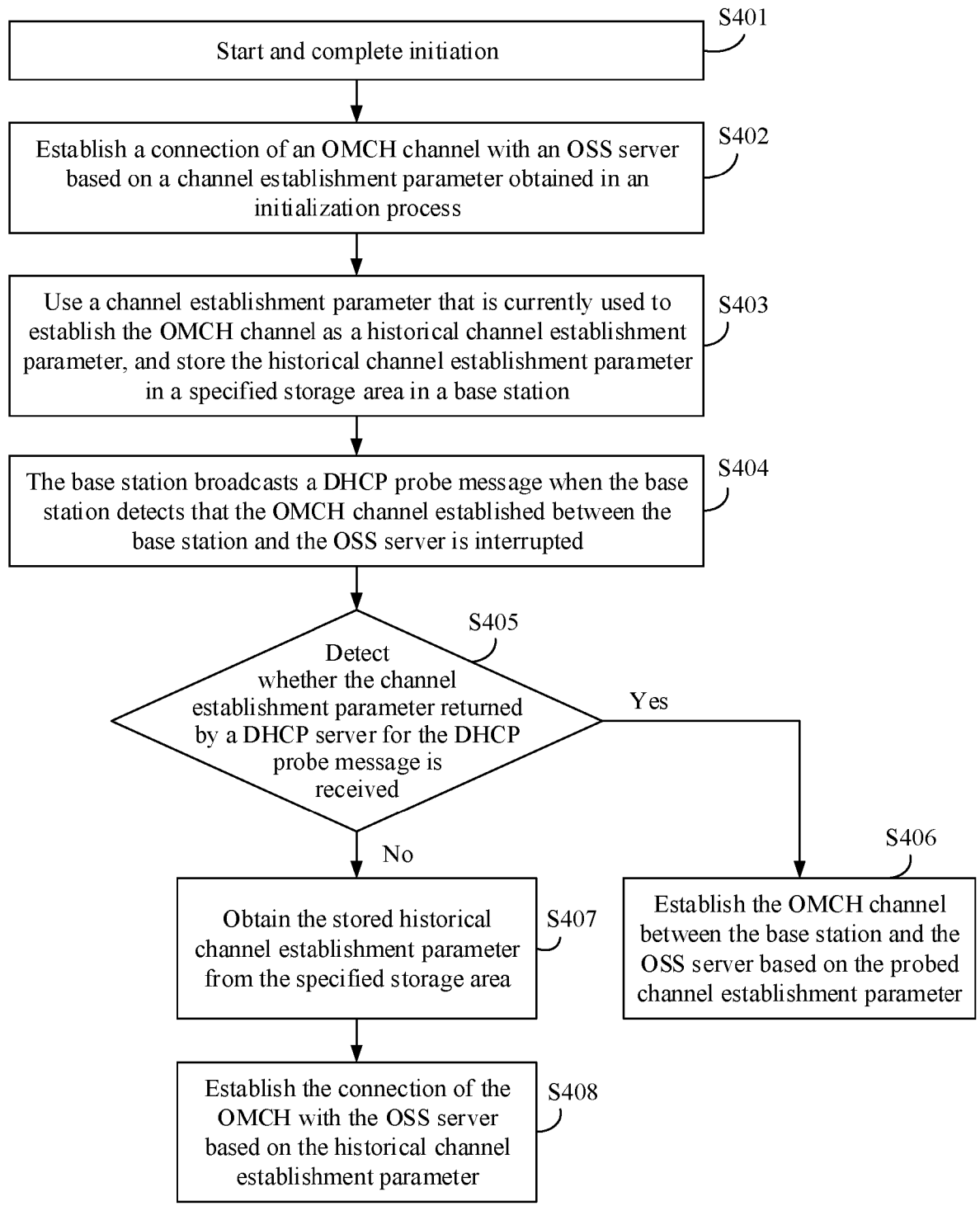
FIG. 4 is another schematic flowchart of a channel establishment method according to an embodiment of this application.
Figure 5:
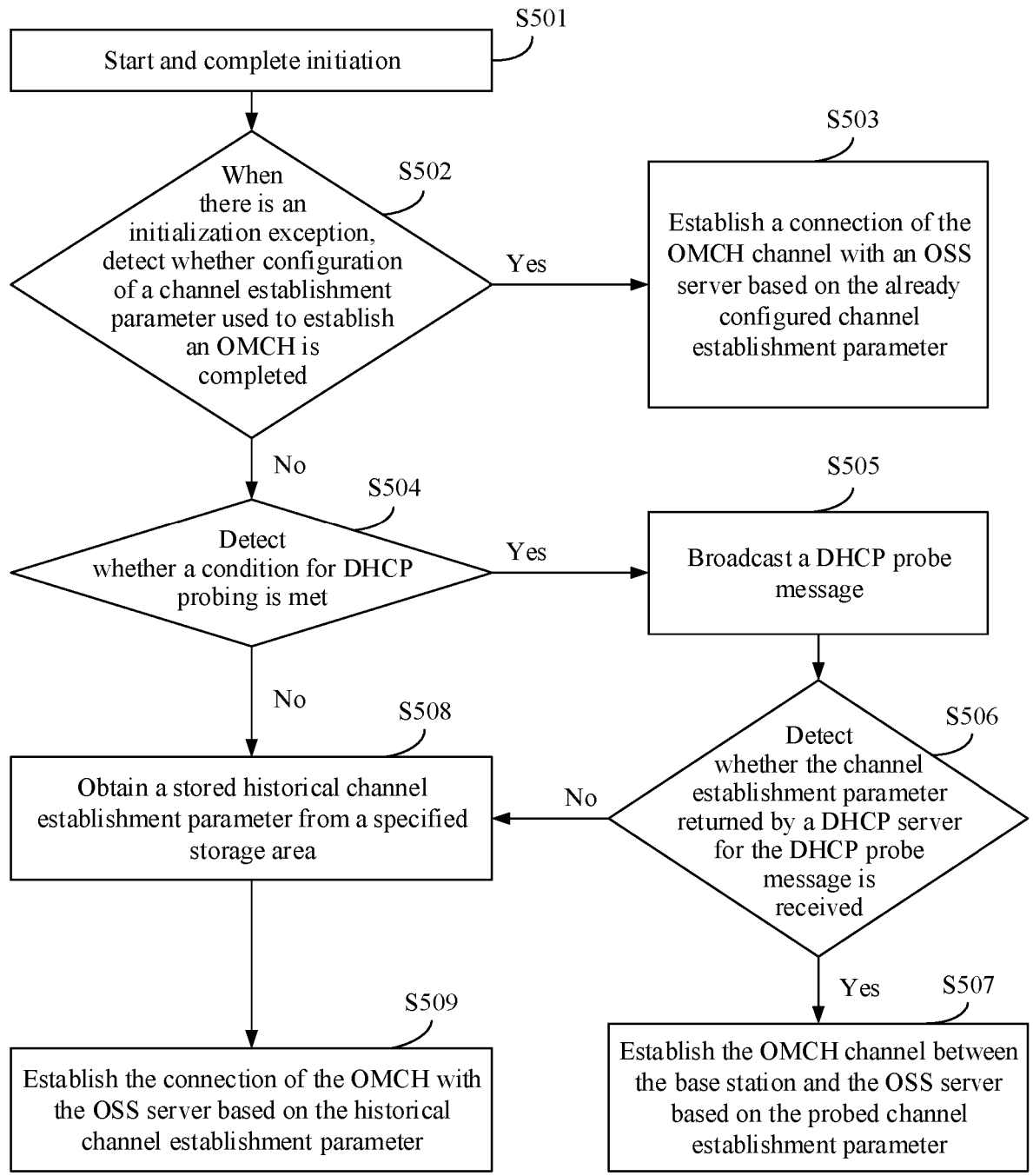
FIG. 5 is still another schematic flowchart of a channel establishment method according to an embodiment of this application.

Specifically, the processor is configured to perform related operations on a base station side in the following procedures shown in FIG. 3 to FIG. 5.

The memory 202 is configured to store, as the historical channel establishment parameter, the channel establishment parameter used by the base station to establish the OMCH channel with the OSS server. The memory 202 may be further configured to store a storage moment, an expiration time, or the like of the channel establishment parameter. To ensure reliable storage of the historical channel establishment parameter, the memory may be a non-volatile memory.

The memory may further store a program required by the processor to perform a channel establishment method, an operating system-related parameter, other data, or the like.

The communications interface 203 is configured to establish, under control of the processor, the connection of the OMCH channel between the base station and the OSS server based on the historical channel establishment parameter obtained from the memory or a channel establishment parameter obtained and configured in another manner.

In addition, the communications interface is further configured to send or receive some messages required by the base station.

In a possible implementation, the memory, the processor, and the communications interface of the base station may be connected by using a communications bus 204.

Certainly, the base station may alternatively include an input apparatus 205. For example, the input apparatus may be a touchscreen, a mouse, a keyboard, or the like. An input unit is configured to receive an instruction entered by a user, a configured parameter, or the like.

It should be noted that FIG. 2 is merely a simple example of the base station. In actual application, the base station may include more or fewer components than the base station shown in FIG. 2. This is not limited herein.

The following describes in detail the channel establishment method in the embodiment of this application with reference to the foregoing commonality.

Figure 3:
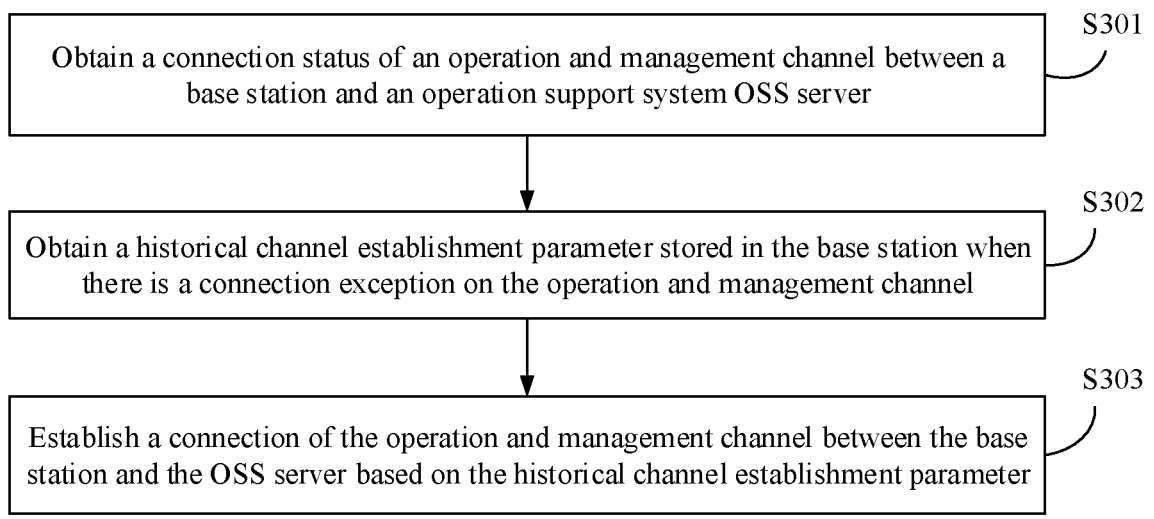
FIG. 3 is a schematic flowchart of a channel establishment method according to an embodiment of this application.

FIG. 3 is a schematic flowchart of an embodiment of a channel establishment method according to this application. The method in this embodiment is applied to a base station, and the method may include the following steps.

S301. Obtain a connection status of an operation and management channel between a base station and an operation support system OSS server.

The operation and management channel OMCH is configured to implement a communication connection between the base station and the OSS server.

It may be understood that the connection status of the OMCH may be that the OMCH between the base station and the OSS server is connected, the OMCH channel between the base station and the OSS server is interrupted, or the OMCH between the base station and the OSS server is not successfully connected.

A processor of the base station may obtain the connection status of the operation and management channel in a plurality of manners. For example, in an initialization process of the base station, whether the OMCH channel is successfully established between the base station and the OSS server may be detected. For another example, when the OMCH channel is already established between the base station and the OSS server, whether the OMCH is normally connected is monitored.

S302. Obtain a historical channel establishment parameter stored in the base station when there is a connection exception on the operation and management channel.

The historical channel establishment parameter is a channel establishment parameter used by the base station to establish the operation and management channel with the OSS server before a current moment. For example, it is assumed that the operation and management channel is successfully established between the base station and the OSS server before the current moment. When the base station detects that the operation and management channel is successfully established, the base station stores, as the historical channel establishment parameter, the channel establishment parameter used to successfully establish the operation and management channel currently.

It may be understood that a connection exception between the base station and the OSS server may be detected by obtaining the connection status of the operation and management channel between the base station and the OSS server. The connection exception may include that the operation and management channel is not successfully established, or the already established operation and management channel is interrupted.

When the obtained connection status of the operation and management channel indicates that there is the connection exception on the operation and management channel, the base station may obtain the historical channel establishment parameter used to successfully establish the operation and management channel before the current moment, so that the base station may reestablish the operation and management channel with the OSS server based on the historical channel establishment parameter.

It may be understood that the base station may store only a historical channel establishment parameter used to successfully establish the operation and management channel with the OS S server last time, or may store a historical channel establishment parameter within a period of time. When the base station stores a plurality of historical channel establishment parameters, the base station may obtain only a historical channel establishment parameter stored last time.

S303. Establish the connection of the operation and management channel between the base station and the OSS server based on the historical channel establishment parameter.

It may be understood that, because the historical channel establishment parameter is the channel establishment parameter used by the base station to successfully establish the operation and management channel with the OSS server before the current moment, the base station may still reestablish the connection of the operation and management channel between the base station and the OSS server by using the historical channel establishment parameter.

It can be learned that in this embodiment of this application, because the base station prestores the historical channel establishment parameter used by the base station to establish the operation and management channel with the OSS server before the current moment, when there is an exception on the operation and management channel between the base station and the OSS server, the base station may also obtain the historical channel establishment parameter stored by the base station, and reestablish or recover, based on the historical channel establishment parameter, the connection of the operation and management channel between the base station and the OSS server. Therefore, a case in which the operation and management channel between the base station and the OSS server cannot be established or recovered because the base station cannot obtain the channel establishment parameter required for establishing the operation and management channel is reduced, thereby helping ensure reliable connection of the operation and management channel between the base station and the OSS server.

It may be understood that, in different running statuses of the base station, specific manners in which the base station detects a connection exception of the OMCH channel between the base station and the OSS server are also different. The following separately describes processing processes of the connection exception of the OMCH channel that occurs when the base station is in different running statuses.

First, a case in which the OMCH channel is interrupted after the base station establishes the OMCH channel with the OSS server and when the base station is running is described. For example, FIG. 4 is a schematic interaction flowchart of another embodiment of a channel establishment method according to this application. The method in this embodiment may include the following steps.

S401. A base station is started and initialized.

S402. The base station establishes a connection of an OMCH channel with an OSS server based on a channel establishment parameter obtained in an initialization process.

The channel establishment parameter is a parameter required for establishing the connection of the OMCH channel, and the channel establishment parameter may include an IP address of the base station, an IP address of the OSS server, or a routing table. Certainly, the channel establishment parameter may alternatively include another parameter, for example, may include some or all of the parameters shown in Table 1.

It may be understood that, after the base station is started, a processor of the base station may obtain related data for configuring the base station by a user, and configure the base station by using the configuration data, to complete the initialization of the base station. In the initialization process of the base station, the data for configuring the base station may include a related parameter required for establishing the OMCH channel. In this way, after the initialization of the base station is completed, the processor of the base station obtains the already configured related parameter required for establishing the OMCH channel, and completes related configuration. In this way, the processor may control a communications interface to establish an OMCH link connection to the OSS server based on the related parameter.

For example, in the initialization process of the base station, the base station obtains a configuration table, for example, obtains the configuration table from a database or obtains a configuration table stored by the base station. The configuration table may include the channel establishment parameter. In this way, the processor of the base station may configure the channel establishment parameter in the base station and other related configuration, for example, configure the IP address and the routing table of the base station in the base station, so that the base station can receive a message sent to the IP address of the base station and send the message to the OSS server based on the routing table. Correspondingly, after configuration of the channel establishment parameter and the related configuration are completed, the base station can establish the OMCH channel with the OSS server, so that the base station can establish the OMCH channel with the OSS server by using the communications interface.

It may be understood that the base station may establish the connection of the OMCH channel with the OSS server based on the channel establishment parameter in a plurality of manners. For ease of understanding, a possible case is used as an example for description.

For example, the OSS server may periodically send an OMCH link establishment request to the base station based on the IP address of the base station, and the OMCH link establishment request is used to instruct the base station to establish the OMCH channel between the base station and the OSS server. After the base station completes configuration of the channel establishment parameter used to establish the OMCH, the base station may receive the OMCH link establishment request. In this way, the base station responds to the OMCH link establishment request, and returns an OMCH link establishment response to the OSS server, so that the OMCH channel is successfully established between the base station and the OSS server.

It should be noted that the foregoing is merely a possible implementation in which the base station establishes the connection of the OMCH channel with the OSS server based on the channel establishment parameter. In actual application, there may be another manner, and another manner in which the base station establishes the OMCH channel with the OSS server based on the channel establishment parameter is also applicable to this application.

S403. The base station uses the channel establishment parameter that is currently used to establish the OMCH channel as a historical channel establishment parameter, and stores the historical channel establishment parameter in a specified storage area in the base station.

In this embodiment of this application, after the base station completes establishment of the OMCH channel between the base station and the OSS server, a memory of the base station stores the channel establishment parameter. Therefore, when the OMCH channel between the base station and the OSS server is interrupted subsequently due to a misoperation or a fault in the base station, a backup OMCH establishment parameter is used to reestablish the OMCH channel.

It may be understood that, because the channel establishment parameter is a parameter used to establish the OMCH channel before a current moment, the base station stores the channel establishment parameter as the historical channel establishment parameter used to establish the OMCH channel historically.

The specified storage area may be set as required. To avoid loss of the historical channel establishment parameter caused by a power failure of the base station or the like, the specified storage area may be a specified storage area in a nonvolatile memory of the base station. For example, the historical channel establishment parameter can be stored in a target file, and the target file may be stored in the non-volatile memory.

It may be understood that channel establishment parameters used by the base station to establish the OMCH channel with the OSS server may be different at different moments, for example, when a network system is updated or the base station or the OSS server is updated, the channel establishment parameter is also updated. Therefore, after the base station stores the historical channel establishment parameter, if the base station subsequently detects that the base station reestablishes the connection of the OMCH channel with the OSS server based on the channel establishment parameter configured by the base station, the base station reobtains a channel establishment parameter used to currently establish the OMCH channel, uses the currently obtained channel establishment parameter as a latest historical channel establishment parameter, and overwrites the historical channel establishment parameter by using the latest historical channel establishment parameter. For example, the historical channel establishment parameter stored before the current moment is deleted, and the latest historical channel establishment parameter currently obtained is stored.

It should be noted that step S401 to step S403 are not operations that need to be performed by the base station when the OMCH channel between the base station and the OSS server is interrupted in this application, but are merely preparation operations performed before the OMCH channel between the base station and the OSS server is interrupted. In actual application, the foregoing step S401 to step S403 do not need to be performed each time.

S404. The base station broadcasts a dynamic host configuration protocol (Dynamic Host Configuration Protocol, DHCP) probe message when the base station detects that the OMCH channel established between the base station and the OSS server is interrupted.

It may be understood that the base station may detect interruption of the OMCH channel in a plurality of manners. For example, the base station may periodically send a heartbeat message to the OSS server through the OMCH channel, and the OSS server may feed back a connection indication after receiving the heartbeat message. If the base station fails to send the heartbeat message for a preset quantity of consecutive times, or if the base station cannot receive, within specified duration, the connection indication sent by the OSS, it may be determined that the connection of the OMCH channel between the base station and the OSS server is interrupted. Certainly, a case in which the base station detects, in another manner, that the OMCH channel is interrupted is also applicable to this embodiment of this application.

The DHCP probe message is used to request a channel establishment parameter from a DHCP server. The DHCP server may be the OSS server, or may be a server that is independently disposed and independent of the OSS server.

The DHCP probe message carries a unique identifier used to identify the base station. For example, the unique identifier of the base station may be a device number of the base station. For another example, when the IP address of the base station is not lost, the unique identifier of the base station is the IP address of the base station.

That the base station broadcasts the DHCP probe message by using the communications interface is actually that the base station initiates DHCP probing. For ease of understanding, a possible DHCP probing manner is briefly described. For example, the DHCP probe message is a DHCP packet. After the base station starts a DHCP process, the base station broadcasts the DHCP packet, and the DHCP packet carries the unique identifier of the base station. For example, the unique identifier of the base station may be an electronic serial number (Electronic Serial Number, ESN) of the base station. If the DHCP server receives the DHCP packet broadcast by the base station, the DHCP server queries, based on the unique identifier of the base station, a database associated with the DHCP server to determine whether a channel establishment parameter such as the IP address of the base station corresponding to the unique identifier of the base station and an IP address of the OSS server is maintained. If the channel establishment parameter corresponding to the unique identifier of the base station is found, the DHCP server sends a DHCP response packet to the base station, and the DHCP response packet carries the channel establishment parameter, for example, the IP address of the base station, the IP address of the OSS server, or a routing table.

The DHCP server prestores channel establishment parameters corresponding to identifiers of a plurality of different base stations. For example, an administrator may import a configuration file that includes the channel establishment parameters to the DHCP server. The configuration file may include the IP address of the base station, the IP address of the OSS server, or the routing table, or may include a hardware parameter, a transmission parameter, or the like.

It may be understood that, if the channel establishment parameter corresponding to the unique identifier of the base station is not found in the DHCP server, it indicates that the channel establishment parameter corresponding to the base station is not yet configured in the DHCP server. In this case, the DHCP server may output prompt information, to prompt the administrator to enter the channel establishment parameter corresponding to the base station.

S405. The base station detects whether the channel establishment parameter returned by the DHCP server for the DHCP probe message is received. If yes, step S406 is performed; if no, step S407 is performed.

It may be understood that channel establishment parameters corresponding to different base stations in a communications network are preconfigured on the DHCP server. For example, the DHCP server may store a mapping relationship between unique identifiers and channel establishment parameters of different base stations. After the DHCP receives the probe message, the channel establishment parameter corresponding to the base station may be sent out, so that the base station can receive the channel establishment parameter by using the communications interface.

S406. The base station establishes the OMCH channel between the base station and the OS S server based on the probed channel establishment parameter.

If the communications interface of the base station receives the channel establishment parameter returned for the probe message, it indicates that the DHCP probing succeeds, so that the processor of the base station may control, by using the probed channel establishment parameter, the communications interface to establish the OMCH channel with the OSS server.

For example, the base station may load the probed channel establishment parameter to complete configuration related to establishment of the OMCH, and then establish the OMCH channel with the OSS server based on the channel establishment parameter.

It may be understood that a manner in which the base station establishes the OMCH channel with the OSS server based on the channel establishment parameter is similar to a process in which the base station establishes the OMCH channel with the OSS server by using the channel establishment parameter configured by the base station. For details, refer to related descriptions of step S402. Details are not described herein again.

It should be noted that, when the OMCH channel is interrupted, the base station broadcasts the DHCP probe message, to perform the DHCP probing process only to further improve reliability of obtaining the channel establishment parameter. However, it may be understood that, in actual application, the probing process in step S404 to step S406 may not be performed as required, but step S407 is directly performed, to obtain the channel establishment parameter used to establish the OMCH channel.

S407. The base station obtains the stored historical channel establishment parameter from the specified storage area.

When the base station does not probe the channel establishment parameter through DHCP probing, or the DHCP probing fails, the processor of the base station may obtain the stored historical channel establishment parameter from the specified storage area. The historical channel establishment parameter is the channel establishment parameter used by the base station to establish the OMCH channel with the OSS server before the current moment, for example, the historical channel establishment parameter may be a channel establishment parameter used by the base station to successfully establish the OMCH channel with the OSS server last time. Therefore, the base station may use the stored historical channel establishment parameter as a channel establishment parameter required for currently recovering the connection of the OMCH channel.

S408. The base station establishes the connection of the OMCH with the OSS server based on the historical channel establishment parameter.

For example, the base station uses the historical channel establishment parameter as the channel establishment parameter required for establishing the OMCH channel, and loads the historical channel parameter, to establish the connection of the OMCH with the OSS server based on the loaded historical channel establishment parameter.

A process in which the base station establishes a link connection of the OMCH with the OSS server based on the historical channel establishment parameter is similar to the foregoing process in which the base station establishes the OMCH channel with the OSS server by using the obtained channel establishment parameter after initialization of the base station. For example, after detecting the OMCH link establishment request of the OSS server, the base station may respond to the OMCH link establishment request, and return the OMCH link establishment response to the OSS server, so that the OSS server connects to the OMCH channel between the base station and the OSS. For details, refer to the foregoing related descriptions. Details are not described herein again.

It may be understood that, in any step of establishing the connection of the OMCH in the foregoing embodiments, before the base station establishes the connection of the OMCH with the OSS server based on the historical channel establishment parameter, an already configured channel establishment parameter obtained in real time, or the probed channel establishment parameter, the base station may detect whether a physical port (that is, a physical port) used to establish the OMCH in the base station is normal. If the physical port is normal, the base station activates the physical port, loads channel establishment parameter configuration, and then returns an OMCH establishment response to the OSS server, and the physical port is used to transmit the OMCH establishment response.

It can be learned that, in this embodiment, after the OMCH channel is established between the base station and the OSS server, the base station may store the channel establishment parameter used for establishing the OMCH channel as the historical channel establishment parameter. In this way, when the connection of the OMCH between the base station and the OSS is interrupted, the base station may obtain the historical channel establishment parameter stored in the base station, and reestablish the OMCH channel with the OSS server by using the historical channel establishment parameter. This helps ensure a reliable connection of the OMCH between the base station and the OSS server, and reduces a case in which the base station cannot reestablish the connection of the OMCH with the OSS server due to a misoperation in the base station or an internal fault of the base station, thereby reducing a quantity of times for which operation and maintenance personnel perform onsite operation and management on the base station, and helping reduce human resource consumption.

The following describes a process of establishing the OMCH channel by the base station when there is a connection exception of the OMCH between the base station and the OSS server because the base station cannot establish the OMCH channel with the OSS server due to an initialization exception of the base station. For example, FIG. 5 is a schematic interaction flowchart of another embodiment of a channel establishment method according to this application. The method in this embodiment may include the following steps.

S501. A base station is started and initialized.

S502. When the base station detects an initialization exception, whether the base station completes configuration of a channel establishment parameter required for establishing an OMCH is detected. If yes, step S503 is performed; if no, step S504 is performed.

It may be understood that, the initialization exception of the base station may cause a configuration error or a configuration failure of the channel establishment parameter configured by the base station to establish the OMCH channel. Consequently, the base station cannot establish a connection of the OMCH with an OSS server, resulting in a connection exception on the OMCH channel between the base station and the OSS server.

It should be noted that step S502 is merely an example by using a case in which the base station cannot establish the connection of the OMCH with the OSS server due to the initialization exception of the base station for description. However, it may be understood that there may be another possible cause for a failure of the base station to establish the connection of the OMCH with the OSS server due to the initialization exception, for example, due to the initialization exception. Another possible cause is also applicable to this embodiment.

S503. The base station establishes the connection of the OMCH with the OSS server based on the already configured channel establishment parameter.

For step S503, refer to the related descriptions in the foregoing embodiments. Details are not described herein again.

S504. The base station detects whether a condition for DHCP probing is currently met. If yes, step S505 is performed; if no, step S508 is performed.

If the base station cannot perform the DHCP probing due to the initialization exception, or the base station does not have a DHCP probing function, the base station does not have the condition for the DHCP probing.

It may be understood that, when the base station meets the condition for the DHCP probing, the base station may initiate the DHCP probing in a subsequent step S505. If the base station does not meet the condition for the DHCP probing, the base station may still complete establishment of the OMCH channel between the base station and the OSS server by performing a subsequent operation of step S508.

It should be noted that, in actual application, step S504 may not be performed, and directly performing the DHCP probing is also applicable to this embodiment.

S505. The base station broadcasts a DHCP probe message.

S506. The base station detects whether the channel establishment parameter returned by a DHCP server for the probe message is received. If yes, step S507 is performed; if no, step S508 is performed.

S507. The base station establishes the OMCH channel between the base station and the OSS server based on the probed channel establishment parameter.

For operations of step S505 to step S507, refer to related descriptions in the foregoing embodiments. Details are not described herein again.

S508. The base station obtains a stored historical channel establishment parameter from a specified storage area.

In this embodiment of this application, the historical channel establishment parameter may be a channel establishment parameter used by the base station to establish the OMCH channel with the OSS server before a current moment. For example, before the base station is started this time, the historical channel establishment parameter may be a channel establishment parameter previously used by the base station to establish the OMCH channel with the OSS server. For another example, before the base station is started this time, the historical channel establishment parameter may be a channel establishment parameter used by the base station to establish the OMCH channel with the OSS server last time.

The specified storage area may be set as required. For example, the specified storage area may be a storage area of a non-volatile memory.

S509. The base station establishes the connection of the OMCH with the OSS server based on the historical channel establishment parameter.

For step S509, refer to related descriptions in the foregoing embodiments. Details are not described herein again.

It can be learned that in this embodiment of this application, when the base station cannot establish the OMCH channel with the OSS server due to a reason such as an initialization exception, the base station may probe the channel establishment parameter by DHCP probing, or use a prestored historical channel establishment parameter. In this way, an OMCH channel between the base station and the OSS server is established, so that a case in which the base station cannot establish the connection of the OMCH with the OSS server can be reduced, and a quantity of times for which operation and maintenance personnel perform onsite operation and management on the base station can be reduced, thereby reducing human resource consumption.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on the technical solutions of this application shall fall within the protection scope of this application.

What is claimed is:

1. A channel establishment method, comprising:
    obtaining a connection status of an operation and management channel between a base station and an operation support system (OSS) server, wherein the operation and management channel is configured to implement a communication connection between the base station and the OSS server;
    broadcasting a dynamic host configuration protocol (DHCP) probe message;
    establishing the connection of the operation and management channel between the base station and the server based on the channel establishment parameter obtained from a DHCP server when the channel establishment parameter returned by the DHCP server for the DHCP probe message is received;
    when no response message for the DHCP probe message is received, obtaining a historical channel establishment parameter stored in the base station when it is determined there is a connection exception on the operation and management channel, wherein the historical channel establishment parameter is a channel establishment parameter used by the base station in the past to establish the operation and management channel with the OSS server; and
    establishing the connection of the operation and management channel between the base station and the OSS server based on the historical channel establishment parameter.

2. The channel establishment method according to claim 1, wherein the obtaining a historical channel establishment parameter stored in the base station when it is determined there is a connection exception on the operation and management channel comprises:
    obtaining the historical channel establishment parameter stored in the base station when it is detected that the operation and management channel already established between the base station and the OSS server is interrupted.

3. The channel establishment method according to claim 2, wherein before the obtaining the historical channel establishment parameter stored in the base station when it is detected that the operation and management channel already established between the base station and the OSS server is interrupted, the method further comprises:
    performing initialization of the base station, and establishing the connection of the operation and management channel between the base station and the OSS server based on a channel establishment parameter obtained in an initialization process; and when it is detected that the operation and management channel is successfully connected, storing, in the base station as the historical channel establishment parameter, the channel establishment parameter obtained in the initialization process.

4. The channel establishment method according to claim 1, wherein the obtaining a historical channel establishment parameter stored in the base station when it is determined there is a connection exception on the operation and management channel comprises:

obtaining the historical channel establishment parameter stored in the base station when it is detected that the base station cannot obtain, in an initialization process, a channel establishment parameter required for establishing the operation and management channel, or that the base station cannot successfully establish the operation and management channel with the OSS server by using a currently already configured channel establishment parameter.

5. A base station, comprising:

a processor; and a non-transitory memory storing processor executable instructions that when executed by the processor cause the base station to perform steps comprising:

obtaining a connection status of an operation and management channel between a base station and an operation support system (OSS) server, wherein the operation and management channel is configured to implement a communication connection between the base station and the OSS server;

broadcasting a dynamic host configuration protocol (DHCP) probe message;

establishing the connection of the operation and management channel between the base station and the server based on the channel establishment parameter obtained from a DHCP server when the channel establishment parameter returned by the DHCP server for the DHCP probe message is received;

when no response message for the DHCP probe message is received, obtaining a stored historical channel establishment parameter from the memory when it is determined there is a connection exception on the operation and management channel, wherein the historical channel establishment parameter is a channel establishment parameter used by the base station in the past to establish the operation and management channel with the OSS server;

establishing the connection of the operation and management channel between the base station and the OSS server based on the historical channel establishment parameter.

6. The base station according to claim 5, wherein obtaining the stored historical channel establishment parameter from the memory when it is determined there is the connection exception on the operation and management channel, the further comprises: obtaining the historical channel establishment parameter stored in the base station when the processor detects that the operation and management channel already established between the base station and the OSS server is interrupted.

7. The base station according to claim 6, wherein the steps further comprise performing initialization of the base station before obtaining the stored historical channel establishment parameter from the memory when the processor detects that the operation and management channel already established between the base station and the OSS server is interrupted;

establishing the connection of the operation and management channel between the base station and the OSS server based on a channel establishment parameter obtained in an initialization process; and it is detected that the operation and management channel is successfully connected, storing, in the memory as the historical channel establishment parameter, the channel establishment parameter obtained in the initialization process.

8. The base station according to claim 5, wherein when the base station obtains the stored historical channel establishment parameter from the memory when it is detected there is the connection exception on the operation and management channel, obtaining the stored historical channel establishment parameter from the memory when the base station detects that the base station cannot obtain a channel establishment parameter required for establishing the operation and management channel, or that the base station cannot successfully establish the operation and management channel with the OSS server by using a currently already configured channel establishment parameter.

* * * * *